Feb. 10, 1931.  L. W. THOMPSON  1,792,257
REGULATING SYSTEM
Filed Feb. 19, 1929
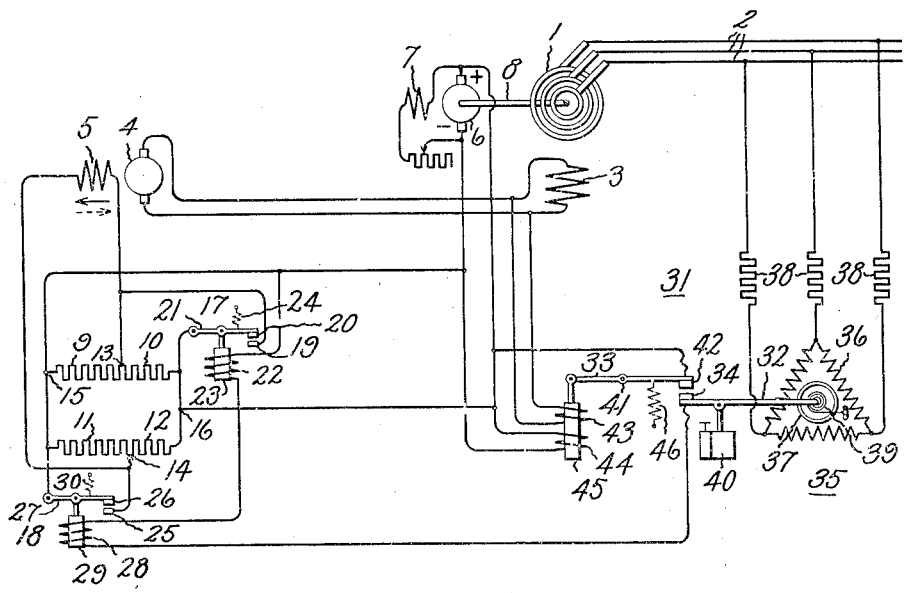
Inventor:
Louis W. Thompson
by Charles V. Tulla
His Attorney Patented Feb. 10, 1931

1,792,257

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING SYSTEM

Application filed February 19, 1929. Serial No. 341,159.

My invention relates to regulating systems and more particularly to electric regulating systems which are arranged to control an electrical characteristic of a dynamo-electric machine by controlling an electrical characteristic of its excitation circuit.

In one of its commercial embodiments my invention is particularly adapted for use in connection with synchronous motors and synchronous condensers. The duty on a regulator for this class of service is rather great due to the wide range of the excitation requirements and the characteristics of the exciters with which the regulator is required to operate. One of the arrangements which has been used heretofore to extend the range of the regulator equipment for synchronous condensers is to provide an auxiliary motor-operated rheostat in the synchronous condenser field which is controlled by a contact-making voltmeter connected to be responsive to the exciter voltage so that when a predetermined minimum exciter voltage is reached, the automatic resistor is operated to increase the resistance in series with the condenser field in order to do away with the necessity of trying to regulate the exciter at a point low on its magnetization curve. This method of regulation is fairly satisfactory but there are a number of disadvantages among which are those in regard to the speed of operation. At the low values of excitation on the condenser this speed would be seriously impaired for the reason that it takes considerable time for the usual type of automatic rheostat to cut out the resistance in case of line faults or disturbances on the system before the regulator would be of any great benefit. This disadvantage coupled with the expense of the rheostat and additional equipment renders this scheme generally objectionable.

It is an object of my invention to provide an improved system of regulation for dynamo-electric machines that is relatively simple in construction and is sensitive in operation over a wide range of an excitation characteristic of said dynamo-electric machine.

Another object of my invention is to provide an improved regulating system of the vibratory type utilized in connection with an exciter for an alternating current dynamo-electric machine which permits the exciter voltage to be regulated with stability to zero or in the reverse direction, which reduces the duty on the relay contacts of the regulator, and which provides stable anti-hunting means and positive action of the regulator even while the exciter voltage is zero or substantially zero.

A further object of my invention is to provide an improved arrangement of regulating means operating in conjunction with a closed series of resistances in the form of a Wheatstone bridge for controlling an excitation characteristic of a dynamo-electric machine.

The novel features which I believe to be characteristic of my invention are set forth with particularity in the appended claims, the invention itself, however, both as to organization and method of operation together with further objects and advantages thereof will best be understood by reference to the following description taken in connection with the accompanying drawing in which the single figure is a diagrammatic illustration of a regulator and system of regulation embodying my invention.

Referring to the drawing, 1 represents a synchronous alternating current dynamo-electric machine which is conventionally illustrated. The synchronous machine 1 is connected to a system of distribution indicated by the conductors 2, and is provided with a field winding 3 which is supplied with an exciting current from an exciter 4. The exciter 4 is provided with a field winding 5 which may be energized from any substantially constant source of direct current. For this purpose I provide an auxiliary exciter 6 of the usual shunt-connected type having a field winding 7 and being mechanically connected to be operated by the synchronous machine 1 through any suitable mechanical coupling indicated by the shaft 8.

The excitation of the field winding 3 is controlled by varying the voltage of the main exciter 4 and its voltage in turn is varied by varying the resistance in circuit with its field winding 5. In accordance with my invention I provide a series of closed resistors 9, 10, 11 and 12 arranged in the form of an electrical bridge of the Wheatstone-type. The field winding 5 is connected across alternate junction points 13 and 14 and the exciter 6 is connected across the junction points 15 and 16 which alternate with the points of connection of said field winding. Either of the connection points 13 and 14 of the bridge may be made adjustable and for purposes of explanation I have shown the connection at 14 to be adjustable. This adjustable connection of the field 5 to the bridge affords an adjustment of the bridge to permit reversal of the exciter field excitation in order to neutralize the exciter residual voltage and thereby permit the synchronous machine if operating as a synchronous condenser to operate at its maximum lagging condition. The bridge arrangement of the resistors permits smaller resistors to be used in handling a given magnitude of current as compared to the well known single resistor arrangement used in connection with a vibratory regulator and as a result the duty on the contacts is considerably less in view of the fact that the voltage drop built up across the resistor is less when the contacts open. This allows fewer relays and higher current rating of the contacts than with the conventional system which is a very advantageous feature when large field currents must be controlled.

In order to control the degree of unbalance in the bridge and thereby the magnitude of the current traversing the field winding 5 I provide in accordance with my invention quick acting regulating means connected to be controlled in accordance with the value of the electrical characteristics regulated for controlling the effective resistance in opposite arms of the bridge. Any regulating means without appreciable inertia and capable of effecting rapid changes in the resistance of the arms of the bridge may be used. For example, vibrating contact relays have been found to give very favorable results. An arrangement of this type is illustrated in the drawing and includes vibratory relays 17 and 18 which are arranged to short-circuit periodically the resistors in opposite arms of the bridge such as the resistors 10 and 11 respectively. The relay 17 may be of any suitable type such for example as the usual differential type used with the commercial type of Tirrill regulator and described in Tirrill Patent 725,800 of April 21, 1903. However, since the specific structure of these relays forms no part of my invention I have conventionally illustrated the relay 17 as comprising a stationary contact 19 which is connected to one side of resistor 10 and a contact 20 mounted on a pivoted arm 21 which is connected to the other side of said resistor. The contact 20 and the movable arm 21 are actuated by an electromagnet comprising a solenoid 22 and a plunger 23 which are connected to move pivoted arm 21. A spring 24 is connected to the arm 21 in a manner to oppose the pull of the plunger 23. The relay 18 similarly comprises a contact 25 connected to the adjustable contact 14 operatively associated with one side of the resistor 11 and a contact 26 mounted on a pivoted arm 27 connected to the other side of the resistor 11. The contact 26 and arm 27 are actuated by an electromagnet comprising a solenoid 28 and a plunger 29 which is connected to move the pivoted arm 27. A spring 30 is connected to the arm 27 in a manner to oppose the pull of the plunger 29.

The relays and thereby the excitation of the exciter 4 may be controlled by any well known type of sensitive regulator but I find it preferable to use a regulator of the vibratory type and particularly one which responds properly under conditions of unbalance in polyphase systems, such as the type described and claimed in United States Letters Patent No. 1,743,798, granted January 14, 1930, upon an application of Robert H. Park, and assigned to the assignee of the present application. This type of regulator provides proper regulation in connection with a polyphase dynamo-electric machine irrespectively of whether the electrical characteristic regulated is the same or different in each phase. Accordingly, the relays 17 and 18 are controlled by the regulator 31 which in the form shown comprises two contact arms 32 and 33. Contact arm 32 carries a contact 34 and is actuated by a dynamo-electric device 35 which comprises a stationary polyphase primary winding or inducing winding 36 for producing a rotating magnetic field and a rotatable closed circuit secondary or induced winding 37. The winding 36 is connected to be energized from all phases of the circuit 2 through suitable limiting resistors 38. The rotatable member 37 is mechanically connected to actuate contact arm 32 and forms a pivot for this arm. The torque of the rotatable member 37 under predetermined normal conditions in the regulated circuit is counterbalanced by the torque of a spring 39. The winding 36 is arranged on the inner periphery of a stator core member of the type employed for induction motors in the usual manner of a polyphase distributed winding, and the rotor member 37 is preferably constructed in the form of a hollow steel shell. The motion of the contact arm 32 is modified by damping means connected thereto and shown as a dashpot 40. The contact arm 33 is pivoted at 41 and carries a contact 42 which is arranged to engage contact 34. Electromagnetic means comprising solenoids 43 and 44 and a plunger 45 which is mechanically connected to said arm is arranged for actuating the contact 42 into and out of engagement with contact 34. The solenoid 41 constituting a part of the so-called anti-hunting means is connected to be energized in accordance with an electrical characteristic of the synchronous machine field circuit and as shown is connected to be responsive to the voltage of the field winding 3. The solenoid 44 which is an additional anti-hunting means is connected to be energized from a source of substantially constant potential and as shown is connected for convenience across the exciter 6. This arrangement furnishes a stable anti-hunting means and positive action of the contacts even though the field excitation of the synchronous condenser is reduced to substantially zero. Resilient means as represented by the spring 46 are connected to the contact arm 33 in a manner to oppose the pull of the solenoids 43 and 44. It will be observed that the main regulator contacts, namely 34 and 42, are connected in series with the circuit through the relay solenoids 22 and 28 from the armature of the auxiliary exciter 6, so that when the contacts 34 and 42 are open the relay coils are deenergized and the contacts 19 and 20 and 25 and 26 are open, and when the main contacts are closed the relay coils are energized and the relay contacts are closed.

The operation of the arrangement shown in the drawing is substantially as follows: First assume that the synchronous machine 1 is in operation and that the exciters 4 and 6 are likewise in operation. Also assume for the instant that contact 34 is in a fixed position. If the combined pull due to the voltage of exciters 4 and 6 is insufficient to overcome the pull of spring 46 contact 42 will engage contact 34 and close the circuit from exciter 6 through the relays 17 and 18. Resistors 10 and 11 are thereby short-circuited and current traverses the field winding in a given direction. If the pull due to the solenoids 43 and 44 is sufficient to overcome the opposing pull of the spring on the arm 33 the contacts will open. This closing and opening of contacts 34 and 42 results in a vibrating action of the relay contacts 19 and 20 and 25 and 26. Now if the bridge were adjusted in regard to resistance values in the different arms so that the ratio of time-opened to time-closed of the contacts of relays 17 and 18 effected a balance in the bridge the points 13 and 14 would be at the same potential and no current would pass through the field winding 5. If the ratio of time-opened to time-closed of the contacts is changed the effective resistance in the arms of the bridge may be changed so that the point 13 is of a higher potential than point 14 and current will flow in the direction indicated by the solid arrow. On the other hand, the point 14 may be shifted from the initial position assumed and with a given ratio of time-opened to time-closed of the contacts of the relays 17 and 18, the potential of the point 14 may be made higher than the point 13 so that current flows in the reverse direction as indicated by the dotted arrow. Thus the field excitation of the exciter 4 and consequently the voltage applied to the synchronous machine field winding 3 will be varied from a maximum positive value to zero and will also permit a voltage in the reverse direction if necessary to permit the machine 1 to operate full lagging if the machine is being operated as a synchronous condenser.

Another convenient way to analyze the operation of the regulator is to consider that there are in effect two currents traversing the field winding in opposite directions and that the effective current is the resultant of these two currents which may be referred to as virtual currents. The polarity of the exciter 6 is indicated by plus and minus signs for convenience of explanation. Assume current to be flowing from the positive terminal of exciter 6 to the point 16 of the bridge. If contacts 19 and 20 and 25 and 26 are closed a virtual current will flow through the contacts 19 and 20, through the field in the direction of the solid arrow, through contacts 25 and 26 to the negative terminal of the exciter 6. There is another circuit from the positive side of the exciter 6, through the resistor 12, through the field winding 5, through the resistor 9, to the negative terminal of the exciter which is traversed by a virtual current in the opposite direction as indicated by the dotted arrow. Now the relative magnitude and direction of these two virtual currents determines the direction and magnitude of the effective current in the winding 5. The bridge is adjusted and by a change in the ratio of time-opened to time-closed of the relay contact this effective current may be varied from a maximum positive current to zero and in the reverse direction.

For a fixed position of arm 32 and contact 34 the voltage of exciter 5 will vary between two values and a certain average value will be obtained. The synchronous machine 1 if being operated as a condenser will then furnish sufficient leading or lagging reactive energy to the system 2 in order to maintain the voltage constant at the point of connection of the regulator in the well known manner. On the other hand if the synchronous machine is operated as an alternator the voltage of the alternator may be held constant by proper variation of its field excitation in the well known manner. If voltage of the system 2 is at the predetermined value which is to be maintained constant the torque of the rotor 37 is arranged to balance the opposing torque of the spring 39 and contact 34 will stay in the assumed position hereinbefore mentioned. Under balanced voltage conditions in system 2 the polyphase currents in the primary windings 36 produce a revolving field which caused induced currents to flow in the rotatable member 37. These induced currents react on the revolving magnetic flux in such a way as to tend to cause the secondary member 37 to be pulled along with the rotating flux. The torque received by the rotatable member 37 is delivered to the contact arm 32. If the voltage of the circuit 2 increases, the torque of the rotor 37 will exceed the counter-balancing torque of the spring 39 and the contact arm will be moved away from contact 42. This decreases the period during which the resistors 10 and 11 are short-circuited and will decrease the excitation voltage applied to the field winding 3. If the machine 1 is operating as an alternator this will decrease the voltage and on the other hand if the machine is operating as a synchronous condenser the reactive energy will be less leading or go to lagging and the voltage will be correspondingly reduced. If the voltage of the system 2 decreases, the torque of the rotor 37 will be less than the counter-balancing torque of the spring 39 and the contact 34 will be moved closer to contact 42 and increase the period during which the resistors 10 and 11 are short circuited. This results in an increase in the voltage applied to field winding 3 and consequently an increase in the voltage of the system 2.

Under unbalanced voltage conditions the phase voltage or the line-to-line voltage of the torque motor regulator 35 will contain symmetrical, positive and negative phase sequence components and the torque of the motor will be proportional to the difference between the squares of the magnitudes of the positive phase sequence components and the negative phase sequence components. This insures that the regulator will tend to increase the synchronous machine excitation upon the occurrence of a single-phase short circuit or upon the addition of a heavy single-phase load.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric regulator including a plurality of resistors arranged in a closed circuit in the form of an electrical bridge, an electrical winding adjustably connected between alternate connection points in said bridge, and resistance varying means arranged for simultaneously varying the resistance of a resistor connected between an adjustable connection point and the next adjacent connection point in said bridge and the resistance of a resistor in an opposite arm of the bridge for controlling the current traversing said electrical winding.

2. In combination, a dynamo-electric machine, a field winding therefor, a plurality of resistors arranged in the form of an electrical bridge, said field winding being adjustably connected to alternate connection points in said bridge for determining the direction of current through said winding, a source of electrical energy connected at fixed points alternating with the connection points of said field winding, and a regulator arranged for simultaneously varying the resistance in opposite arms of said bridge including the resistance of a resistor between an adjustable connection point and a fixed connection point for controlling the current traversing said field winding.

3. In combination, a dynamo-electric machine, a field winding therefor, a plurality of resistors arranged in the form of a Wheatstone bridge and connected in circuit with said field winding, a source of electrical energy connected to energize said bridge, and vibratory means for periodically short-circuiting resistors of different resistance values in opposite arms of said bridge in accordance with variations in an electrical characteristic of said dynamo-electric machine for controlling the current traversing said field winding.

4. In a system of distribution, a transmission line, a synchronous dynamo-electric machine connected thereto and having an exciting winding, a direct-current dynamo-electric machine provided with a field winding and connected to supply current to said exciting winding, a plurality of resistors arranged in the form of an electrical bridge, said field winding being adjustably connected to said bridge for varying the ratio of said arms and controlling the direction of current traversing said field winding, a substantially constant voltage source of direct current connected to alternate junction points in said bridge other than the points of connection of said field winding, and a regulator of the vibrating contact type connected to be responsive to an electrical characteristic of said transmission line for controlling the effective resistance in opposite arms and thereby the excitation current of said synchronous machine, said regulator having an electromagnetic coil connected to be responsive to the voltage of said exciting winding and an electromagnetic coil arranged to have a substantially constant energization.

5. In a system of distribution, a transmission line, a synchronous condenser connected thereto and having an exciting winding, a direct current dynamo-electric machine provided with a field winding and connected to supply current to said exciting winding, a plurality of resistors arranged to form an electrical bridge of four resistance arms, said field winding being adjustably connected to alternate junction points in said bridge for determining the direction of current flow through said field winding, an auxiliary dynamo-electric machine connected to be operated by said synchronous condenser and arranged for furnishing a substantially constant voltage source of direct current, said auxiliary dynamo-electric machine being connected to junction points in said bridge alternating with the connection points of said field winding, a regulator of the vibrating contact type including a movable element having an actuating winding connected to be responsive to the voltage of said transmission line and a vibratory element having an actuating winding connected to be energized in accordance with the voltage of the synchronous condenser field winding and an actuating winding co-operating accumulatively with said first-mentioned actuating winding and connected to be responsive to said substantially constant voltage source, and vibrating contact relays controlled by said regulator and arranged to short circuit opposite arms of said bridge for controlling the current traversing said exciting winding.

In witness whereof, I have hereunto set my hand this 18th day of February, 1929.

LOUIS W. THOMPSON.